Inventor
Josef Petrik

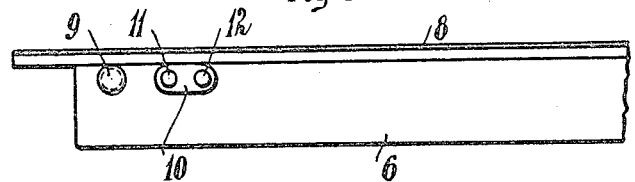
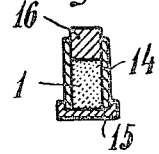
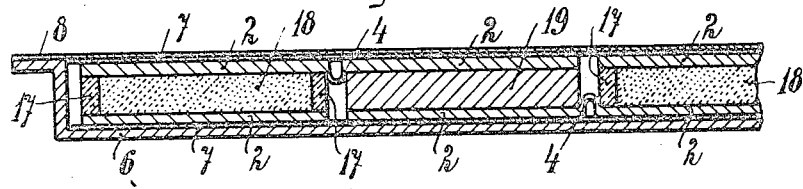
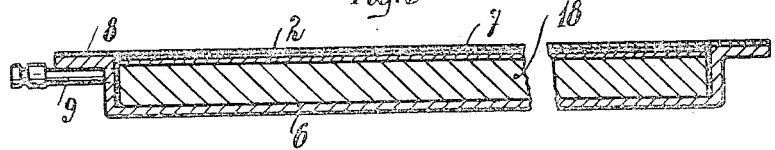
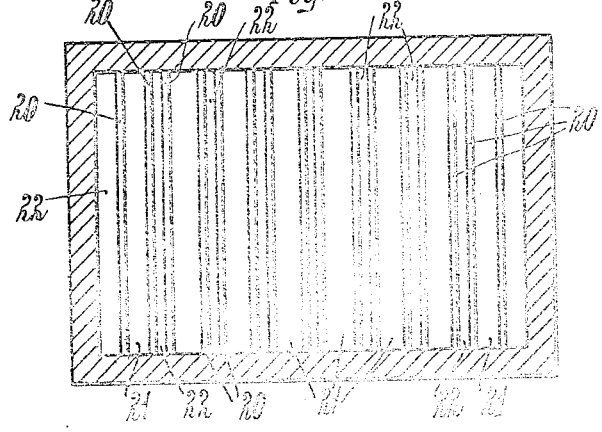

Patented Mar. 8, 1932

1,848,655

UNITED STATES PATENT OFFICE

JOSEF PETŘÍK, OF PRAGUE-VINOHRADY, CZECHOSLOVAKIA

VACUUM THERMOELECTRIC BATTERY

Application filed May 16, 1929, Serial No. 363,480, and in Czechoslovakia June 15, 1928.

The object of the present invention is to produce a thermo-electric battery which is of practical utility and generates a considerable amount of current as compared with its weight, and the invention consists in the provision of a hermetically sealed box which is lined with insulating material and which contains electrodes made of positively and negatively active material and placed with their ends against conductive plates adapted to effect heat interchange between the electrodes and the box walls.

The electrodes may consist either of solid plates or of compressed powder arranged within supporting shells and may take various forms.

Fig. 1 of the accompanying drawings represents sectional views of different forms of electrodes, Fig. 2 is a top view of the conducting plates, Fig. 3 is a cross-section on the line $x$—$x$ of Fig. 2 of the plates and electrodes.

Fig. 6 is a view at right angles to Fig. 5,

Fig. 7 is a longitudinal section of a different form of electrode.

Fig. 8 is a sectional view of a battery of modified construction,

Fig. 9 is a section at right angles to Fig. 8, and

Fig. 10 is a horizontal section of the thermo-electric generator composed of a plurality of batteries according to the invention.

Figure 1:
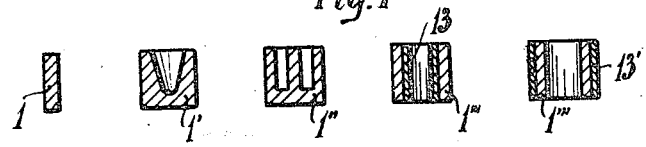
Figure 2:
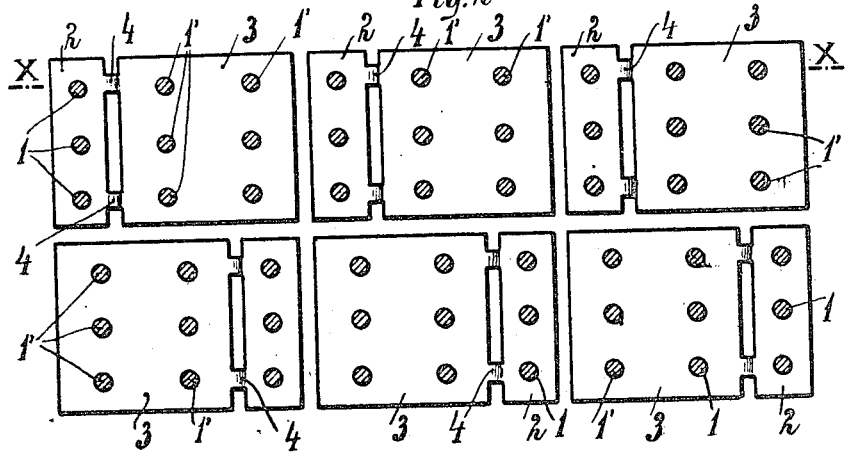
Figure 3:
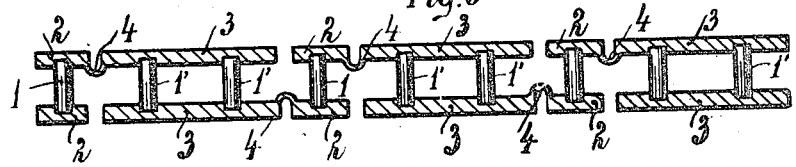
Figure 4:
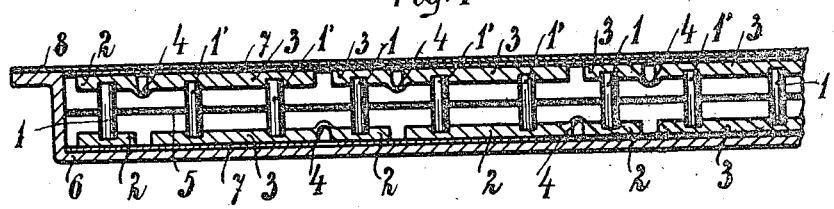
Fig. 4 is a cross-section of a complete battery.
Figure 5:
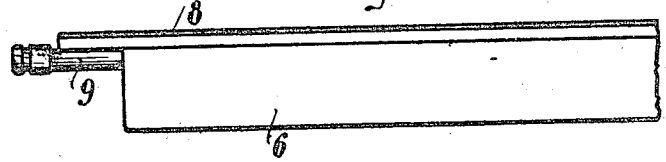
Fig. 5 is a part elevation of the battery.

Positive and negative electrodes 1, 1', 1'', 1''' of suitable, thermo-electrically active material are made by pressing, casting or cutting in the forms of rods or blocks of any suitable cross-section, Fig. 1 showing various examples. These electrodes are placed endways, positives and negatives separately, and either isolated or in symmetrical groups, between copper plates 2 and 3 which are connected, alternately at the top and at the bottom, by pliable bridge pieces 4.

Rows of such elements may be further connected by means of bridge pieces 4 either in series or in parallel and arranged, together with thin strips of mica 5 or other insulating material silvered on one or both sides so as to form reflecting surfaces, in juxtaposition in a dished rectangular plate 6. The plate 6 and a cover plate 8 are both made of nickel steel (64% Fe and 36% Ni) and lined with a layer of asbestos paper 7 or similar insulating material. The cover plate is placed on top of the thermo-electric elements and welded electrically to edge flanges on the plate 6 so as to form a hermetically closed box. A pipe 9 is included in the box structure so as to communicate with the interior thereof and the structure also includes a hollow block 10 through which the lead and return wires 11 and 12 are admitted with a hermetically tight fit. The air is exhausted from the box through the pipe 9, and the atmospheric pressure on the plates 6 and 8 will therefore cause the latter to clamp the plates 2 and 3 and the electrodes together into a rigid structure capable of resisting outer mechanical influences. If the electrodes should not by themselves possess sufficient rigidity, they may be complemented by tubular stiffening elements 13, 13' made of hard glass or molten quartz.

Electrode substances which can only be obtained in powdered form may be filled into tubes 14 made of quartz or glass of high melting point and fitted with a metal bottom 15 and an easily inserted stopper 16.

Thermo-electric substances of high ohmic resistance and small thermic conducting capacity may, if used, take the form of solid, perforated or slit plates made by hydraulic pressure from a fine powder and provided with metal plated bearing surfaces. As an alternative, the powder may be packed into frames 17 between the plates 2. Fig. 8 shows both forms of electrodes, the powder electrode being shown at 18 and the compact plate at 19.

In the simplest arrangement the two electrodes may, together with their metal shells, be mounted separately so that each individual element forms two isolated structures. In this case one of the two metal plates 2 can be omitted.

The complete electric generator is obtained by mounting a given number of box structures or battery plates 20 within a fire-proof insulation in uniform groups. Vertically or horizontally or in any other suitable position. The plates are tightened to the insulation so as to form independent passages 21 and 22. A hot liquid or hot combustion gases are led through the passages 21, and a cooling medium is led through the passages 22 either in counter or cross current.

Owing to the employment of nickel steel of the kind described for the battery plates, the latter will be subjected to little or no expansion by the heat, and no detrimental stresses, which might destroy the battery will therefore be produced.

Owing to the fact that a complete vacuum is maintained about the electrodes, the latter can be chosen with regard to their thermo-electric qualities only, no oxidation of the material being possible. In an evacuated space as described, it is possible to generate electro-motive forces amounting to more than half a volt for each individual element.

Since all the electrodes of the battery are firmly clamped between the base plates by the outside atmospheric pressure, and since the bearing surfaces are not subjected to any oxidation, the ohmic resistance between these surfaces will be insignificant. The electrodes may be joined electrolitically to the base plates so as to form a single structure.

A further result of the vacuum is that no gas will be present which might effect a heat interchange by convection between the cold and the hot battery surfaces outside the electrodes. Heat interchange by radiation is prevented by the introduction of the reflecting surfaces.

It will be evident from the described construction that the temperature drop in the batteries is concentrated between the ends of the electrodes, i. e., at the only points which come into consideration for the generation of electric current. At the same time, the difference in temperature between the heating and cooling mediums and the corresponding contact elements of the battery will be very small, so that the loss of the thermic potential will be reduced to a minimum. Thus it is possible to utilize effectively heating mediums of very low temperature, a sufficient number of elements being arranged in parallel to obtain the desired voltage. The small difference in temperature between the contact surfaces and the heating and cooling mediums has moreover the advantage that the distance between the hot and the cold ends of the electrodes, and thus the bulk of materials employed, can be very small as compared with the achieved result.

I claim:

1. A thermo-electric battery comprising a flat hermetically sealed metal box lined with insulating material, plates of conducting material arranged in the box and placed against the box walls so as to be capable of heat interchange with the latter, and electrodes of positively and negatively active material arranged transversely in the box with their ends abutting against said plates.

2. A thermo-electric battery as claimed in claim 1, wherein the box is evacuated and adapted to clamp the electrodes and plates together under the influence of the atmospheric pressure.

3. A thermo-electric battery as claimed in claim 1, wherein the box is made of nickel steel of a minimum coefficient of expansion.

JOSEF PETŘÍK.